Figure 1:
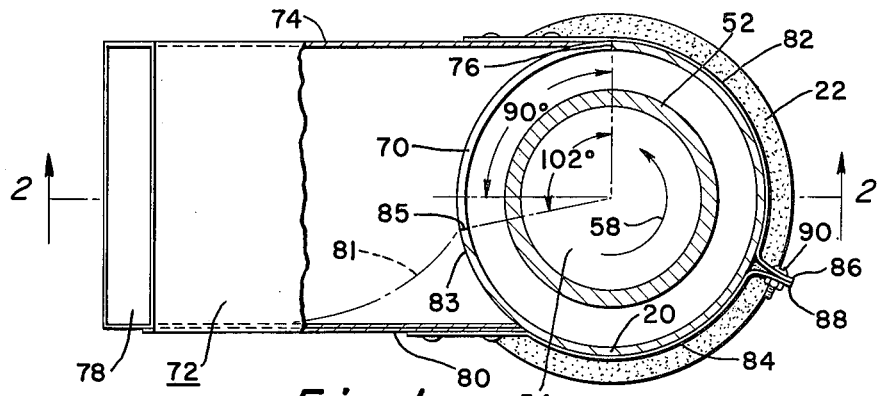

Nov. 30, 1965   J. R. PICHLER   3,220,215
AUGER ICE MAKER
Filed Aug. 3, 1964

INVENTOR.
Joseph R. Pichler
BY
Carl A. Stickel
His Attorney

United States Patent Office
3,220,215
Patented Nov. 30, 1965

3,220,215
AUGER ICE MAKER
Joseph R. Pichler, Dayton, Ohio, assignor to General Motors Corporation, Detroit, Mich., a corporation of Delaware
Filed Aug. 3, 1964, Ser. No. 386,971
5 Claims. (Cl. 62—354)

This invention pertains to refrigerating apparatus and more particularly to flake or chip type liquid freezers such as are illustrated in Patents 3,034,317 issued May 15, 1963 and 3,101,598 issued August 27, 1963.

I find in freezers of this general type that instead of supplying flakes or chips of frozen liquid in a smooth steady stream, there is a tendency for the flakes or chips to be packed and compressed adjacent the discharge opening from the freezing chamber and to be discharged irregularly in chunks of considerable size. This defeats the primary purpose of the chip or flake machine since it does not provide loose uniformly sized frozen material which can be readily packed closely around or in any object or container to be cooled.

It is an object of this invention to provide a liquid freezer of the flake or chip type in which compression or compacting of the flakes or chips is substantially prevented and the frozen liquid is discharged in a substantially smooth, steady, noncompacted, noncompressed stream of loose individually free uniformly sized frozen flakes or chips.

This and other objects are attained in the form shown in the drawings by providing a discharge chute having one side extending tangentially from an edge of a discharge opening in the cylindrical portion of the casing in such a way that the flakes or chips leave the outer casing in a tangential path. The flakes or chips are fed in the tangential path in the same direction as the scraper is rotated so that the flakes or chips exit smoothly in a steady even flow without any compression or compacting.

In carrying out the above object it is a further object to enhance the action described through the use of a chute discharge opening greater in area than the opening in the cylindrical portion of the casing.

Further objects and advantages of the present invention will be apparent from the following description, reference being had to the accompanying drawings wherein preferred embodiments of the present invention are clearly shown.

Figure 2:
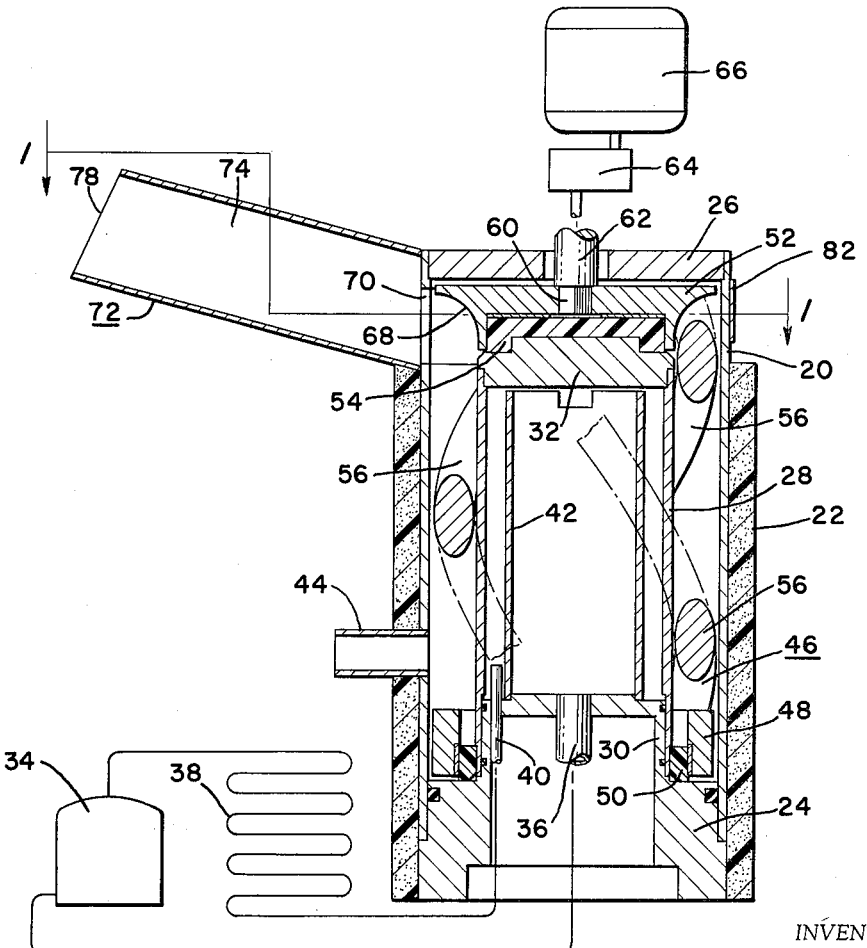

In the drawings:

FIG. 1 is a view in section of a liquid freezer incorporating a discharge chute embodying one form of my invention and taken along line 1—1 of FIG. 2; and FIG. 2 is a vertical sectional view taken along the lines 2—2 of FIG. 1.

Referring now to the drawings and more particularly to FIG. 2, there is shown a liquid freezer which includes an outer metal cylinder 20 preferably surrounded by insulation 22. This cylinder is provided with a bottom closure member 24 and a top closure member 26. Inside the outer cylinder is an inner cylinder 28 which is supported and sealed to an upwardly projecting portion 30 of the bottom member 24 which is also sealed to the outer cylinder 20. The inner cylinder 28 is closed and sealed at the top by the top plate 32. A sealed motor compressor unit 34 removes evaporated refrigerant from the inside of the inner cylinder 28 through the suction conduit 36 and forwards the compressed refrigerant to the condenser 38 where it is liquefied and supplied through a capillary restrictor supply conduit 40 to a space between an inner cylindrical baffle 42 and the inner cylinder 28. The liquid refrigerant evaporates in the space between the inner cylindrical baffle 42 and the adjacent wall of the inner cylinder 28 to keep the wall at substantially below freezing temperatures of the liquid to be frozen. The liquid refrigerant, after it evaporates, flows over the top of the baffle 42 to the entrance of the suction conduit 36 in the bottom member 24.

The liquid to be frozen, such as water, is fed through a supply conduit 44 under some form of liquid level control into the space between the inner and outer cylinders 28 and 20. The liquid level control may be similar to that in either of the aforementioned patents. It keeps the level of the liquid to be frozen substantially at the top of the inner cylinder 28. The cold surfaces of the inner cylinder 28 freeze the liquid thereon.

To harvest this frozen liquid in the form of chips or flakes, there is provided a scraper 46 located between the cylinders 28 and 20 which is substantially in contact with the outer surfaces of the inner cylinder 28. This scraper 46 includes a lower ring 48 rotatably mounted on the lower bearing 50 which is supported on the bottom member 24 concentrically with the cylinders 28 and 20. The scraper 46 also includes a top plate 52 having a bottom recess rotatably mounted on the bearing 54 which is mounted on top of the top member 32 of the inner cylinder 28. The top member 52 is connected by three substantially helical scraper members 56 spaced 120° apart connecting the members 52 and 48. These members 56 extend helically upwardly in a direction opposite the arrow 58 in FIG. 1. The top member 52 is provided with a centrally located squared aperture which receives the projecting squared end 60 of a drive shaft 62 driven at a very slow speed through a gear reduction 64 by an electric motor 66. This motor rotates the scraper 46 in the counter clockwise direction as indicated by the arrow 58 in FIG. 1.

The top member 52 has an upwardly and outwardly extending annular curved surface 68 on its periphery which is designed to move the flakes or chips outwardly to the discharge opening 70 provided in the wall of the outer cylindrical member 20 substantially above the top of the inner cylinder 28. The slow rotation of the scraper 46 in this direction scrapes the frozen liquid off the outer surface of the inner cylinder 28. The helical shape of the members 56 carries the frozen liquid upwardly through the unfrozen liquid in the space between the cylinders until it reaches the upwardly and outwardly curved annular peripheral surface 68 of the top member 52.

It has been customary to put a relatively small plain opening in the outer wall to permit discharge of the flakes or chips from the outer cylinder 20. Sometimes an outlet duct is provided which connects directly with such an opening. I have found that the flakes or chips tend to be compressed or packed into chunks at the trailing edge of the outlet. This is particularly true when the conventional chute is provided which is perpendicular to the opening. This is objectionable since it does not provide loose flake ice which can be readily packed and conformed to articles or containers to be cooled.

I have found that this objectionable packing of the ice flakes can be substantially eliminated by positioning the discharge outlet 70 in specific relation to the wall of the outer cylinder 20. I also provide a rectangular box-shaped chute 72 as a means for guiding the flakes from the discharge outlet 70. The side wall 74 of the chute in the specific construction used by me is positioned substantially tangentially to the outer cylinder 20 at the edge 76 of the outlet 70 which constitutes the edge nearest the oncoming counter clockwise moving flakes or chips toward which the three scraper members 56 move in sequence. That is the wall 74 is tangential to the outer casing at that edge 76 where the scraper is moving toward the opening.

The discharge outlet 70 extends circumferentially around the outer metal cylinder 20 for an angular distance not in excess of 110° and not less than 90° and preferably about 102°. These angular dimensions are quite important to the success of the operation since I have found that where the opening is of the proper size and position that the tendency toward packing is substantially eliminated. The outer end of chute 72 as noted in FIG. 1 is considerably wider than the outlet 70 and, thus, permits the flakes to distribute therein as they are moved outwardly and preferably upwardly to permit the water to drain backwardly into the container. With this arrangement the flakes or chips will be carried outwardly from the wall of the cylinder 20 nearest the edge 76 tangentially along the wall 74 and will be moved freely up the chute to the mouth 78 thereof where they will be discharged into any suitable container. The extension 83 of the wall of the outer cylinder 20 is positioned at the other side of the opening or outlet 70 namely at the trailing side thereof with respect to the direction of the rotation of the scrapers. This extension ends in a narrow edge 85 which tends to cut the flakes apart as they are moved around by the scraper arms and forced into contact therewith and this further improves the discharge of the flakes in a nonpacked condition. It is apparent that the extension 83 of the wall may extend angularly within the range of from 90° to 110° with respect to the edge 76. It is also apparent that the use of a baffle 81 may be used to implement the flow, said baffle being shown in dotted lines in FIG. 1. The baffle may be attached to the chute 72 or may be attached to the extension 83, in either case the baffle provides a smooth surface to guide the flakes outwardly of the device and thereby enhance the operation thereof.

With this arrangement, the major portion of the flakes or chips will be carried from the inner wall of the cylinder 20 nearest the edge 76 directly, tangentially along wall 74 of the chute and will be moved freely to the mouth 78 of the chute outwardly of the opening 70 while most of the remaining chips will be broken up against the edge 85 of wall 83 and will be discharged into the chute and moved outwardly into the expanded portion thereof along the wall 80 whereby all of the chips will be moved freely up the chute to the mouth 78 thereof where they will be discharged into a suitable container.

The chute 72 may be fastened to the cylinder 20 by a set of straps 82 and 84 which are riveted respectively to the side walls 74 and 80 at their one end. These straps 82 and 84 extend around cylinder 20 and are provided with out-turned ends 86 and 88 which are fastened together by the bolt and nut 90 to tightly clamp the chute 72 to the cylinder 20. The chute 72 is cut to fit the remainder of the cylinder 20 surrounding the opening 70 so as to be substantially sealed to the cylinder 20.

It is understood that the height of the opening 70 must be sufficient to prevent packing and this dimension may be easily determined by trial. For a specific device wherein the cross sectional area of the chamber between the inner cylinder 28 and the outer cylinder 20 is 8.8 sq. in. and with a scraper speed of about 12 r.p.m., the height of the opening should be such that the area thereof is not less than 75% of the cross sectional area of the chamber, or 6.6 sq. in. This figure will obviously vary in accordance with the cross sectional area of the chamber, the speed of the scraper and the angular extent of the opening and may be calculated for any given set of conditions. Suffice it to say, that at no time should the cross sectional area of the opening to the chute be such as to cause packing of the flakes since the entire concept of this invention is to prevent packing so that the frozen flakes will be delivered to the storage compartment in a free and substantially separated condition.

While the embodiments of the present invention as herein disclosed, constitute preferred forms, it is to be understood that other forms might be adopted.

What is claimed is as follows:

1. In an apparatus for freezing liquids which includes a generally vertically disposed cylindrical outer casing, a chilled inner casing capable of freezing liquids thereon and defining a chamber between the inner casing and the outer casing, means for supplying liquid to said chamber to maintain a liquid level therein, and a rotatable flake lifting scraper disposed within said chamber and rotatable upon an axis to lift frozen liquid on said inner casing upwardly of said chamber, said scraper having a plurality of symmetrically located lifting blades extending at an angle to said axis, said outer casing having an outlet above said liquid level, the combination of a discharge device associated with the upper end of said cylindrical outer casing and including a chute having an entrance above said liquid level communicating through said outlet with said chamber and being offset from the center of said chamber so as to have one side of said chute positioned substantially tangentially to the cylindrical outer casing of the chamber in the same direction as the scraper is rotated for guiding smoothly frozen liquid from the chamber outwardly thereof without packing, said outlet opening having an edge located substantially at the junction of said tangentially positioned side of the chute and the cylindrical outer casing, the circumferential extent of said outlet opening being less than 110° and at least 90° and the height of said outlet opening with respect to the circumferential extent thereof being sufficient to prevent packing.

2. In an apparatus for freezing liquids which includes a generally vertically disposed cylindrical outer casing, a chilled inner casing capable of freezing liquids thereon and defining a chamber between the inner casing and the outer casing, means for supplying liquid to said chamber to maintain a liquid level therein, and a rotatable flake lifting scraper disposed within said chamber and rotatable upon an axis to lift frozen liquid on said inner casing upwardly of said chamber, said scraper having a plurality of symmetrically located lifting blades extending at an angle to said axis, said outer casing having an outlet opening above the liquid level extending circumferentially between 90° and 110°, the combination of a discharge device associated with the upper end of said cylindrical outer casing and including a chute removably mounted on said outer casing having an entrance substantially above said liquid level communicating through said outlet with said chamber and being offset from the center of said chamber so as to have the leading side of the chute positioned substantially tangentially to the cylindrical outer casing of the chamber in the same direction as the scraper is rotated for guiding smoothly frozen liquid from the chamber outwardly thereof without packing, said outlet opening having an edge located substantially at the junction between said tangentially located side and the cylindrical outer casing, the circumferential extent of said chute being less than 180° and greater than 110°, and a baffle extending within said chute from the trailing side of the chute and effectively comprising an extension of said chamber wall for closing the chute entrance adjacent the chamber to a circumferential extent of from at least 90° to less than 110°, the height of said chute and outlet opening being sufficient to prevent packing.

3. Apparatus as defined in claim 1 wherein said chute extends continuously upward from said opening.

4. Apparatus as defined in claim 2 wherein the baffle includes a narrow leading edge capable of cutting the mass of advancing frozen liquid into small chips.

5. Apparatus as defined in claim 2 wherein the baffle closes the chute opening from said chamber to a circumferential extent of about 102°.

References Cited by the Examiner
UNITED STATES PATENTS

| | | | |
|---|---|---|---|
| 2,749,722 | 6/1956 | Knowles | 62—354 X |
| 2,943,461 | 7/1960 | Davis | 62—354 |
| 3,034,317 | 5/1962 | Schneider et al. | 5—62 |
| 3,133,428 | 5/1964 | Schneider | 5—64 |
| 3,159,010 | 12/1964 | Kattis | 62—344 X |

ROBERT A. O'LEARY, *Primary Examiner.*